United States Patent [19]

Oliapuram

[11] 4,335,192
[45] Jun. 15, 1982

[54] METHOD OF PREPARING A SINTERED IRON ELECTRODE

[75] Inventor: Antony Oliapuram, Frankfurt, Fed. Rep. of Germany

[73] Assignee: Varta Batterie A.G., Hanover, Fed. Rep. of Germany

[21] Appl. No.: 197,216

[22] Filed: Oct. 15, 1980

[30] Foreign Application Priority Data

Oct. 16, 1979 [DE] Fed. Rep. of Germany ....... 2941765

[51] Int. Cl.$^3$ .................... H01M 4/26; H01M 4/52
[52] U.S. Cl. .................................. 429/221; 75/221; 75/222
[58] Field of Search ............... 429/221, 212; 75/221, 75/200, 222; 252/182.1

[56] References Cited

U.S. PATENT DOCUMENTS

| 1,988,861 | 1/1935 | Thorausch et al. | 429/221 X |
| 2,122,053 | 6/1938 | Burkhardt | 75/222 |
| 2,683,182 | 7/1954 | Salanze | 429/221 |
| 2,800,520 | 7/1957 | McGraw | 429/221 X |
| 2,832,813 | 4/1958 | Peters | 429/221 |

Primary Examiner—Anthony Skapars
Attorney, Agent, or Firm—Weiser, Stapler & Spivak

[57] ABSTRACT

To activate metallic sintered iron electrodes, ammonium halogenides are suitable as activating means, mixed with the iron powder right from the start, if appropriate together with conductive graphite and an organic pore forming substance such as polyvinyl alcohol. They begin to function while still in the paste, and during drying, as well as in the early stages of the sintering process. This can be extended up to two hours at temperatures which are close below the decomposition temperature of the ammonium halogenides (300°–350° C.). After volatilization of the ammonium halogenide, the sintering is completed at the terminal temperature of, for example, 700° C. for one hour and cooling is then performed in an $H_2$ atmosphere down to room temperature.

14 Claims, No Drawings

METHOD OF PREPARING A SINTERED IRON ELECTRODE

The invention relates to a process for producing a highly active, metallic sintered iron electrode which is provided with a metallic supporting insert.

Because of the various desirable properties of iron electrodes with respect to voltage level, higher theoretical energy yield, availability of raw material, and particularly because of favorable environmental characteristics, interest in iron electrodes has increased greatly in recent times. The manufacture of the electrode itself takes place in various ways.

The classical method, dating back to Edison, for producing active metallic iron powder involves dissolving the pure iron in sulfuric acid, subjecting the iron sulphate derived from the solution to a baking process at 900° C., and reducing it in hydrogen current at 450° C. after washing and oxidizing drying. The iron powder so formed can subsequently be sintered either in the dry state or as a moist paste in an $H_2$ current after application to a support, and thus formed into an electrode. Later electrochemical processes for making active iron masses have also become known, e.g., in accordance with Austrian Pat. No. 320,770, which teaches the electrolysis of an iron nitrate solution, with copper salt added to it.

In another process, in accordance with U.S. Pat. No. 3,679,482, there is applied to a porous carrier of metal matting, an active material which is obtained by reduction of a mixture of $FeO$, $Fe_2O_3$, $Fe_3O_4$, or $Fe_2O_3 \times H_2O$ with 5-20% sulfur. This is pasted to the metal frame. The electrode is treated with a solution of $Co(NO_3)_2$. It is then dried and immersed in KOH or NaOH, whereby $Co(OH)_2$ is obtained.

More recently, there has been a change to the sintering of a very pure iron powder, e.g., carbonyl-iron powder, directly into electrodes in $H_2$ current. In this case, the capacity yield was thought to be between 35 and 40% of its theoretical value.

For the necessary activation of the iron electrode, there are used various additives, e.g., sulfur, which is either added to the electrolyte or alternatively mixed in with the mass. For sinter processes, it is preferable to add the sulfur to the electrolyte because it otherwise escapes during the sintering process. Selenium and tellurium can be used in a manner similar to sulfur.

However, other additives, such as alkali halogenides have also proven to be activity-promoting. Probably the operation of these substances is based upon the corrosive property of the halogen ions and consequently is less pronounced for dry sinter electrodes than for electrodes which are first pasted up wet and subsequently sintered. It is known that halogen ions are strongly corrosive substances. Through this corrosion, the surface is oxidized and during sintering, metallic iron is again formed from the oxide, which causes a great increase in the active surface.

From the German patent publication (Auslegeschrift) No. 1,533,320, it is known to use ammonium chloride as a pore forming substance in the manufacture of porous metal bodies which are produced under high pressure without external heat supply. The surface increase which can thus be achieved must, however, take into account the subsequent inconvenient leaching out of the filler.

Accordingly, it is an object of the present invention to produce an active iron electrode by means of a sinter process without having to use a subsequent treatment to remove an activating additive from the electrode.

This and other objects which will appear are achieved in accordance with the invention by sintering the iron powder in the presence of an ammonium halogenide as the activating means.

The advantage of the technique embodying the invention is that the activating means volatilizes already during the sintering period. Depending upon the choice of the halogenide, for example, $NH_4Cl$, $NH_4Br$ or $NH_4I$, the additive escapes already at sinter temperatures between 350° and 550° C. In this $NH_4Cl$ has a preferred role. In addition, an activating influence is also produced by other salts such as $NH_4NO_3$ or $(NH_4)_2SO_4$.

The ammonium halogenides start to function in activating manner while still in the paste and during drying, so that it is not harmful that the halogenide disappears from the electrode at the beginning stage of the sintering process.

In accordance with the invention, there is mixed into the iron powder which is to be used, ammonium halogenides in a proportion of about 0.1 to 10% by weight, preferably 1 to 5% by weigth. If during sintering, the iron powder is heated too quickly up to the necessary terminal temperature, which may be 700° C. for example, there is the danger that the ammonium halogenide may evaporate explosively and thereby leave behind large holes or rips in the subsequently completed electrode. It is therefore advantageous to raise the prepared mass progressively, and particularly first during one-half to one hour to a temperature which lies close below the decomposition temperature of the ammonium halogenide, for example, 300° C. Then, for an additional hour, a temperature of about 350° C. is used. Finally, for one hour the full sinter temperature of 700° C. is maintained. Thereafter cooling takes place in $H_2$ atmosphere to room temperature.

Although the metallic iron itself is a good conductor, during the discharge there takes place a worsening of the electrical conductivity of the mass, due to the formation of poorly conductive iron oxides. This leads to increased polarization during discharge. To prevent this, a conductive material can be added to the mass. This conductive material itself, however, must not decompose during discharge nor must it influence the discharge reaction detrimentally in other ways. Also, the conductive material must not become lowered in quality through oxide formation or the like.

Metals such as silver and copper have been used for this purpose with only moderate success. In contrast, in accordance with the invention, fine graphite powder has proven highly desirable.

It is true that graphite has a somewhat poor conductivity in comparison with metals. In contrast to them, however, it is completely inert, so that its conductivity remains unaltered during charging and discharging. In addition, the porosity of the iron mass is favorably affected by the graphite additive. Electrodes with higher porosity exhibit better high current behavior. Too much graphite causes poor mechanical strength of the electrode. It is desirable to have the graphite content below about 5%, although even up to 10% graphite yields useable results. The preferred construction utilize about 2% graphite content.

The proper grain size of the added graphite powder is also important. The best results are obtained when the grain size of the powder used has 90% below 50 μm. However, coarser powders also bring about an improvement in the electrode properties.

The addition of substances in addition to graphite powder and the activating ammonium halogenide, which decompose at the sinter temperature, can lead to an increase in porosity. Especially desirable for this has been found to be polyvinyl alcohol. This may be added in quantities of about 1 to 10% by weight, preferably 2 to 5% by weight.

I claim:

1. The process of producing a highly active metallic sintered iron electrode which is provided with a metallic support insert comprising
   treating a mixture of iron powder and an ammonium halogenide as the activating substance by first maintaining it for about ½ to one hour at a temperature which is closely below the decomposition temperature of the ammonium halogenide, and
   subsequently completing the sintering at the actual sintering temperature,
   whereby the ammonium halogenide starts to function in activating manner before reaching sintering temperature and disappears from the electrode at the beginning of the actual sintering.

2. The process of claim 1 wherein
   the iron powder is mixed with ammonium halogenide in proportions of 0.1 to 10% by weight.

3. The process of claim 2 wherein
   the ammonium halogenide is mixed in the proportions of about 1 to 5% by weight.

4. The process of claim 1 wherein
   the ammonium halogenide is $NH_4Cl$.

5. The process of claim 1 further comprising
   mixing in with the iron powder about 0.2 to 10% by weight of graphite powder.

6. The process of claim 5 wherein
   the proportion of graphite powder is between 1 and 5% by weight.

7. The process of claim 6 wherein
   about 90% of the graphite powder quantity has a grain size smaller than 50 μm.

8. The process of claim 1 further comprising additionally
   adding to the iron mass as pore-former an organic substance which decomposes at the sintering temperature.

9. The process of claim 8 wherein
   the pore-forming substance is mixed in in proportions of 1 to 10% by weight.

10. The process of claim 9 wherein
    the pore-forming substance is mixed in in proportions of 2 to 5% by weight.

11. The process of claim 8 wherein
    the pore-forming substance is polyvinyl alcohol.

12. The sintered iron electrode made by the process of claim 1.

13. The process of producing a highly active metallic sintered iron electrode which is provided with a metallic support insert comprising
    treating a mixture of iron powder and an ammonium halogenide as the activating substance by first maintaining it for about ½ to one hour at a temperature which is closely below the decomposition temperature of the ammonium halogenide,
    thereafter for about one hour maintaining a temperature above a first-mentioned temperature, but below full sintering temperature, and
    finally completing the sintering at the full sintering temperature.

14. The process of claim 13, wherein the first-mentioned temperature is about 300° C., the full sintering temperature is about 700° C., and the temperature below full sintering temperature is about 350° C.

* * * * *